(12) United States Patent
Chen et al.

(10) Patent No.: US 12,494,639 B2
(45) Date of Patent: Dec. 9, 2025

(54) HIGH VOLTAGE RIDE THROUGH DEVICE AND METHOD, WIND POWER CONVERTER, AND WIND TURBINE SET

(71) Applicant: GOLDWIND SCIENCE & TECHNOLOGY CO., LTD., Xinjiang (CN)

(72) Inventors: Liquan Chen, Beijing (CN); Liangnian Lv, Beijing (CN)

(73) Assignee: GOLDWIND SCIENCE & TECHNOLOGY CO., LTD., Xinjaing (CN)

( * ) Notice: Subject to any disclaimer, the term of this patent is extended or adjusted under 35 U.S.C. 154(b) by 0 days.

(21) Appl. No.: 18/575,377

(22) PCT Filed: Sep. 24, 2021

(86) PCT No.: PCT/CN2021/120071
§ 371 (c)(1),
(2) Date: Dec. 29, 2023

(87) PCT Pub. No.: WO2023/272976
PCT Pub. Date: Jan. 5, 2023

(65) Prior Publication Data
US 2024/0322566 A1    Sep. 26, 2024

(30) Foreign Application Priority Data

Jun. 29, 2021   (CN) .......................... 202110726658.0

(51) Int. Cl.
*H02J 3/00*    (2006.01)
*H02J 3/38*    (2006.01)
(52) U.S. Cl.
CPC ................ *H02J 3/001* (2020.01); *H02J 3/38* (2013.01); *H02J 2300/28* (2020.01)

(58) Field of Classification Search
CPC ........... H02J 3/001; H02J 3/38; H02J 2300/28
See application file for complete search history.

(56) References Cited

U.S. PATENT DOCUMENTS

2012/0133343 A1\* 5/2012 Grbovic ................ F03D 9/255
322/21
2013/0021700 A1  1/2013 Greither
(Continued)

FOREIGN PATENT DOCUMENTS

CN   101047072 A   10/2007
CN   202634264 U   12/2012
(Continued)

OTHER PUBLICATIONS

International Search Report mailed Mar. 2, 2022; PCT/CN2021/120071.
(Continued)

*Primary Examiner* — Sean Gugger

(57) ABSTRACT

A high voltage ride through (HVRT) device and method, a wind power converter, and a wind turbine set. The HVRT device comprises: an unloading module (200), which comprises a brake module (220) and a first switching element (210) that form a series connection with one another, and which is configured to discharge energy when a HVRT occurs; a controller (100), which is configured to detect a direct current (DC) bus voltage so as to control the first switching element (210) to be turned on when a HVRT occurs and the DC bus voltage is greater than a first threshold and less than or equal to a second threshold, such that the brake module (220) inputs and discharges energy; and a passive driving circuit (400), which applies a turn-on signal to a control terminal of the first switching element (210) by using the DC bus voltage in response to the DC bus
(Continued)

voltage being greater than the second threshold, such that the brake module (220) inputs and discharges energy.

11 Claims, 3 Drawing Sheets

(56) References Cited

U.S. PATENT DOCUMENTS

| | | | | |
|---|---|---|---|---|
| 2013/0193933 | A1* | 8/2013 | Andresen | H02P 9/02 |
| | | | | 322/23 |
| 2019/0149063 | A1* | 5/2019 | Onda | B60L 3/12 |
| | | | | 361/30 |
| 2020/0287382 | A1* | 9/2020 | Gao | H02J 50/10 |

FOREIGN PATENT DOCUMENTS

| | | |
|---|---|---|
| CN | 103538481 A | 1/2014 |
| CN | 104242347 A | 12/2014 |
| CN | 105048497 A | 11/2015 |
| CN | 105337479 A | 2/2016 |
| CN | 106787144 A | 5/2017 |
| CN | 207234381 U | 4/2018 |
| CN | 108538536 A | 9/2018 |
| CN | 110212594 A | 9/2019 |
| CN | 209592984 U | 11/2019 |
| CN | 111277130 A | 6/2020 |
| CN | 210864457 U | 6/2020 |
| CN | 211428910 U | 9/2020 |
| CN | 111934303 A | 11/2020 |
| CN | 112054485 A | 12/2020 |
| CN | 112670065 A | 4/2021 |
| CN | 113422362 A | 9/2021 |
| DE | 102011079569 A1 | 1/2013 |
| KR | 20060003487 A | 1/2006 |
| WO | 2020/187479 A1 | 9/2020 |

OTHER PUBLICATIONS

Extended European Search Report dated Oct. 17, 2024; Appln. No. 21947904.5.
Eklas Hossain, et al; "Analysis and Mitigation of Power Quality Issues in Distributed Generation Systems Using Custom Power Devices", IEEE Access, Published Mar. 12, 2018; 18 pages.
Sun Xiaoyan, et al; "High Voltage Ride Through Control Strategy for Doubly-fed Induction Generator Considering Loss", New Energy vol. 48, Issue 12, 2020; 7 pages.
The First Chinese Office Action dated Jun. 28, 2022; Appln. No. 202110726658.0.

\* cited by examiner

HIGH VOLTAGE RIDE THROUGH DEVICE AND METHOD, WIND POWER CONVERTER, AND WIND TURBINE SET

CROSS-REFERENCE TO RELATED APPLICATIONS

This application is a National Stage of International Application No. PCT/CN2021/120071, filed Sep. 24, 2021, which claims the benefit of and priority to Chinese Patent Application No. 202110726658.0, filed Jun. 29, 2021, the entireties of which are hereby incorporated herein by reference.

FIELD

The present disclosure relates to the field of wind power, and in particular to a high voltage ride through apparatus, a high voltage ride through method, a wind power converter and a wind turbine.

BACKGROUND

With the gradual increase in the proportion of renewable energy provided to a grid, the grid has higher requirements for the high voltage ride through (HVRT) of wind turbines and photovoltaic units.

FIG. 1 is a graph of durations of high voltage ride through (HVRT) and low voltage ride through (LVRT).

As shown in FIG. 1, based on that 1.3 times pu (the pu herein refers to the rated voltage of the grid connected to the wind turbine) lasting 500 ms, a higher requirement of 1.5 times pu lasting 5 ms is put forward.

The wind turbine can cope with the high voltage ride through by putting an unloading module composed of an IGBT, a freewheeling diode and a brake resistor into operation in a direct current loop. When a direct current bus voltage increases because of increase of a grid voltage, the increase of the direct current bus voltage is detected by a voltage detection loop. Then a controller sends a turn-on signal to the IGBT, so that the brake resistor is put into operation in the direct current bus and discharges direct current energy, to ensure that the direct current bus voltage is within a safe voltage range. After the direct current bus voltage is detected to reach a brake resistor cutting out threshold, the controller controls the IGBT to be turned off, to cut the brake resistor out.

In the existing manner of putting the brake resistor into operation, the controller collects a signal, processes it with software, and then sends a turn-on signal to turn on the IGBT. The whole processing takes about 2 ms. In dealing with the high voltage ride through of more than 1.3 times pu, the direct current bus voltage may rise too fast, such that it exceeds a safety threshold before the brake resistor is put into operation, resulting in device damage.

The above is only presented as background for understanding relevant technical content. Disclosure of the above content does not mean that the content is conventional art.

SUMMARY

One of the objectives of the present disclosure is to provide a high voltage ride through control apparatus capable of discharging electric energy in a high voltage ride through period.

One of the objectives of the present disclosure is to provide a high voltage ride through control apparatus which can avoid overheating damage to a device caused by a brake module being put into operation for too long.

According to a first aspect of the present disclosure, a high voltage ride through control apparatus for a wind turbine is provided. The high voltage ride through control apparatus includes: an unloading module including a brake module and a first switching element connected in series with each other, configured to discharge electric energy when high voltage ride through occurs; a controller, configured to detect a direct current bus voltage, and control the first switching element to be turned on to put the brake module into operation to discharge electric energy, when the high voltage ride through occurs and the direct current bus voltage is greater than a first threshold and less than or equal to a second threshold; and a passive drive circuit, configured to apply, by using the direct current bus voltage, a turn-on signal to a control terminal of the first switching element to put the brake module into operation to discharge electric energy, in response to that the direct current bus voltage is greater than the second threshold.

According to a second aspect of the present disclosure, a high voltage ride through control method for a wind turbine is provided. The high voltage ride through control method includes: detecting a direct current bus voltage; controlling, in response to that high voltage ride through occurs and the direct current bus voltage is greater than a first threshold and less than or equal to a second threshold, a first switching element of an unloading module to be turned on, to put a brake module of the unloading module into operation to discharge electric energy; and applying, by using the direct current bus voltage, a turn-on signal to a control terminal of the first switching element, to put the brake module into operation to discharge electric energy, in response to that the direct current bus voltage is greater than the second threshold.

According to a third aspect of the present disclosure, a wind power converter is provided, which includes the high voltage ride through control apparatus of the wind turbine described above.

According to a fourth aspect of the present disclosure, a wind turbine is provided, which includes the wind power converter described above.

With the high voltage ride through control apparatus and the high voltage ride through control method according to the embodiments of the present disclosure, for high voltage ride through of more than 1.3 times pu, a response speed is improved and a reliability of the system is also ensured.

BRIEF DESCRIPTION OF THE DRAWINGS

The above and other objectives and features of the present disclosure will become clearer through the following description of the embodiments in conjunction with the drawings, where:

FIG. 1 is a graph of durations of high voltage ride through and low voltage ride through;

DETAILED DESCRIPTION

Same or similar reference labels may be used to indicate the same or similar elements. For clarity and brevity, descriptions of known components and/or constructions are omitted.

As used herein, the terms "have", "may have", "include" or "may include" features (such as quantities, functions, operations or modules of components) indicate the presence of features and do not exclude the presence of other features.

It will be understood that when an element such as a first element known as operably or communicably "combined with . . . ", "combined to . . . " or "connected with . . . ", "connected to . . . " such as an another module of a second component, it may be directly combined with another module, combined to another module, or connected with another module, connected to another module, through a third element. By contrast, it will be understood that when the first element is called "directly combined with . . . ", "directly combined to . . . " or "directly connected with . . . ", "directly connected to . . . " the second element, there is no third element between the first element and the second element.

In the following, embodiments of the present disclosure are described with reference to the drawings. It should be understood that this disclosure is not limited to the embodiments and that all variations and/or equivalents or substitutes thereof are also within the scope of the present disclosure.

Figure 1:
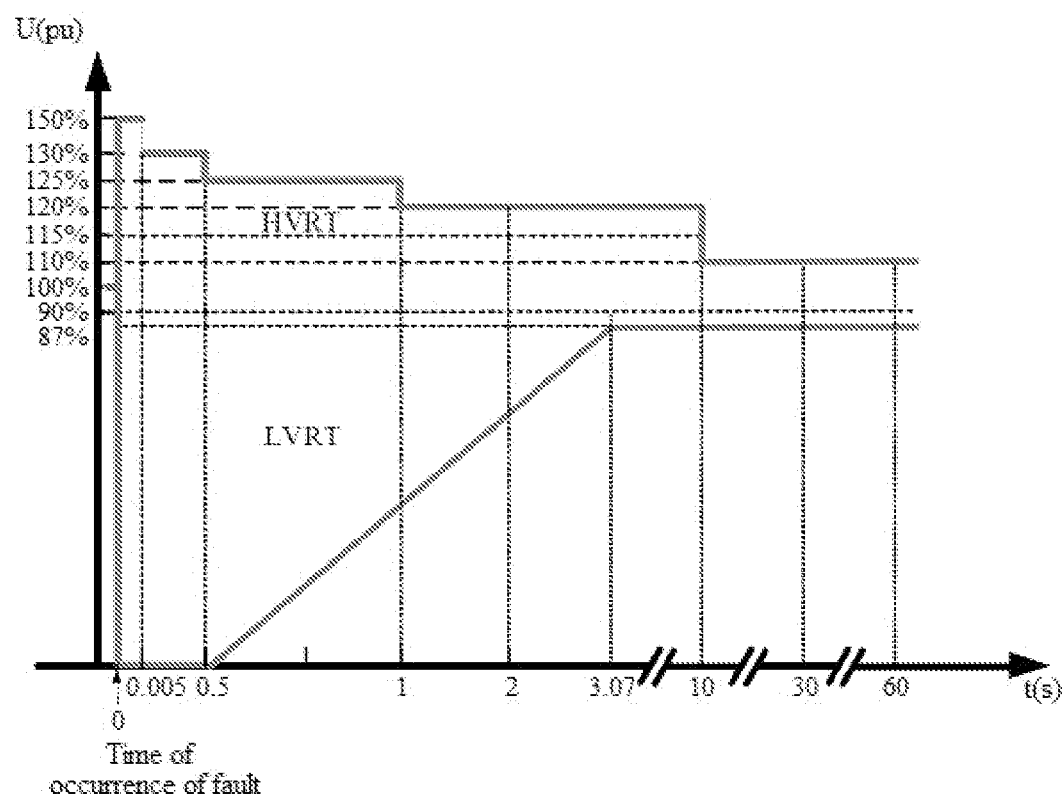
Figure 2:
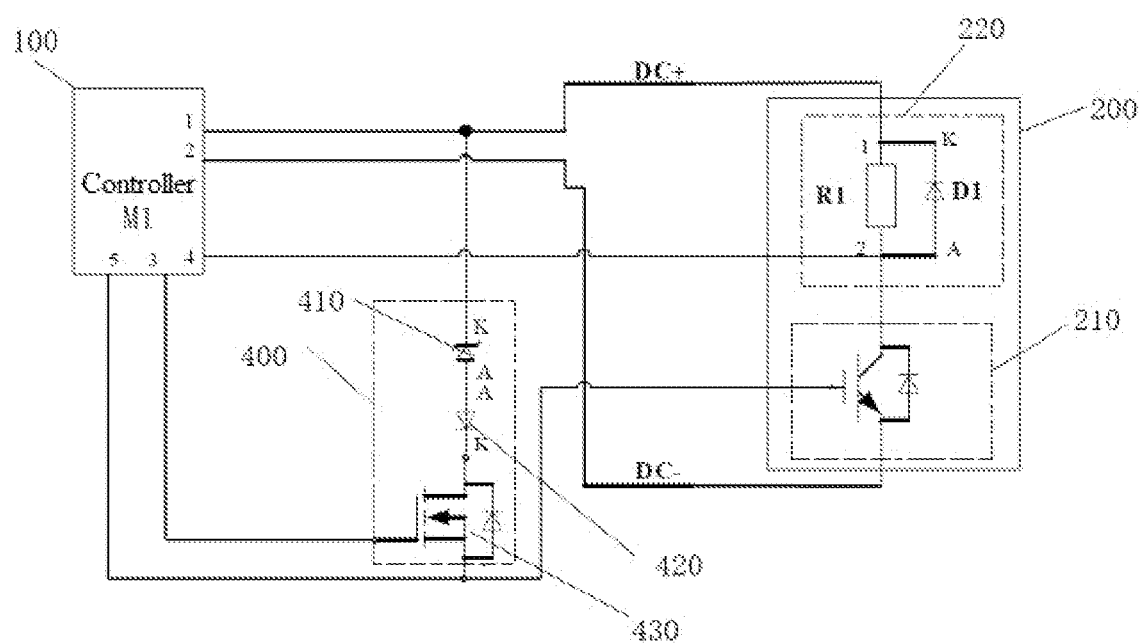
FIG. 2 is a schematic circuit diagram of a high voltage ride through control apparatus according to an embodiment of the present disclosure.

FIG. 2 is a schematic circuit diagram of a high voltage ride through control apparatus according to an embodiment of the present disclosure.

According to an embodiment of the present disclosure, a high voltage ride through control apparatus for a wind turbine includes an unloading module 200, a controller 100, and a passive drive circuit 400.

The unloading module 200 is configured to discharge electric energy, for example, a high voltage, when high voltage ride through occurs. The unloading module 200 may be electrically connected between a positive pole DC+ and a negative pole DC− of a direct current bus, so that the high voltage on the direct current bus can be discharged when required.

The high voltage herein refers to a voltage higher than a rated voltage pu of a grid the wind turbine is connected to. The rated voltage pu is generally calculated according to a voltage at a point of common coupling. For example, the rated voltage pu may be 690V, 900V, 1140V, 10 kV, 35 kV or any other voltage level. The voltage level of the rated voltage in each country may be different, while in all these countries, calculation and determination can be made according to the pu value.

As shown in FIG. 2, the unloading module 200 may include a brake module 220 and a first switching element 210, and the brake module 220 and the first switch element 210 may be connected in series with each other.

When high voltage ride through occurs, the unloading module 200 may be controlled to be selectively put into operation to discharge electric energy.

The brake module 220 may be electrically connected between the positive pole DC+ and the negative pole DC− of the direct current bus, and may include a brake resistor R1.

In addition, the brake module 220 may further include a freewheeling diode D1. The brake resistor R1 and the freewheeling diode D1 may be connected in parallel with each other. When a direct current bus voltage is too high, energy of the direct current bus can be discharged through the brake resistor R1 to ensure that the direct current bus voltage does not continue rising.

As shown in FIG. 2, pin 1 of the brake resistor R1 of the brake module 220 may be connected to the positive pole DC+ of the direct current bus, and pin 2 of the brake resistor R1 may be connected to an input terminal (for example, a collector) of the first switching element 210.

An anode (electrode A) of the freewheeling diode D1 may be connected to pin 2 of the brake resistor R1, and a cathode (electrode K) of the freewheeling diode D1 may be connected to pin 1 of the brake resistor R1.

The structure of the brake module 220 is not limited to the above, as long as the brake module 220 includes a brake resistor that can consume electric energy and a switching element that can be selectively turned on.

The brake module 220 further includes other auxiliary elements in addition to the brake resistor, and a number, connection mode and resistance of the brake resistor of the module 220 are not specifically limited. For example, the brake module 220 may include two resistors connected in series with each other.

Furthermore, although FIG. 2 shows that the first switching element 210 includes one switching element, the number, connection mode and types of switching elements included in the first switching element 210 are not specifically limited.

The first switching element 210 may be a MOSFET, and the type of the first switching element 210 is not specifically limited. For example, the first switching element 210 may alternatively be an IGBT, a triode or any other switching element.

Furthermore, the first switching element 210 may be turned on when its control terminal (for example, a gate) receives a high level.

At a moment when the first switching element 210 is turned off, the freewheeling diode D1 forms a freewheeling loop with the brake resistor R1, to prevent a voltage spike caused by a parasitic inductance of the brake resistor R1 from breaking down the first switching element 210.

The controller 100 may detect the direct current bus voltage, and control the first switching element 210 to be turned on, to put the brake module 220 into operation to discharge electric energy, when the high voltage ride through occurs and the direct current bus voltage is greater than the first threshold and less than or equal to the second threshold.

The first threshold may be the rated voltage as described above, the second threshold may be 1.3 times the rated voltage, and specific values of the first threshold and second threshold may be adjusted as required.

As shown in FIG. 2, the controller 100 may be a single control module, pin 1 of the controller 100 may be connected to the positive pole DC+ of the direct current bus, and pin 2 of controller 100 may be connected to the negative pole DC− of the direct current bus. That is, detection of the direct current bus voltage is implemented through pin 1 and pin 2 of the controller 100.

In addition, pin 5 of the controller 100 is connected to the control terminal (for example, the gate) of the first switching element 210, thereby implementing on-off control of the first switching element 210.

Specifically, in a case that the first switching element 210 contains one switching element, the control terminal (for example, the gate) of the first switching element 210 may be connected to pin 5 of the controller 100, and the input terminal (for example, the collector) of the first switching element 210 may be connected to pin 2 of the brake resistor R1 or electrode A of the freewheeling diode D1. An output terminal (for example, an emitter) of the first switching element 210 may be connected to the negative pole DC− of the direct current bus.

As an example, when pin 5 of the controller 100 emits a high level signal, the first switching element 210 may be turned on to put the brake resistor R1 into operation in the direct current bus to discharge energy of the direct current bus, preventing the direct current bus voltage from being too high. When pin 5 of the controller 100 emits a low level signal, the first switching element 210 may be turned off to cut the brake resistor R1 out from the direct current bus, so that a wind power converter can operate normally. It is merely an example that the high level signal puts the brake resistor R1 into operation in the direct current bus to discharge energy. When the structure of the first switching element 210 is changed (for example, when the first switching element includes a different number and different types of switching elements), the brake resistor R1 may alternatively be put into operation in the direct current bus through a low level signal to discharge energy of the direct current bus.

Although the drawing shows that the controller 100 and the passive drive circuit mentioned hereinafter control the same switching element, it is only an example. The first switching element may include at least two switching elements, and the controller 100 and the passive drive circuit mentioned hereinafter may control different switching elements respectively, thereby implementing put-in and cut-out control of the brake resistor R1.

As an example, pin 4 of the controller 100 may be connected to pin 2 of the brake resistor R1, and pin 1 and pin 4 of the controller 100 can implement the function of detecting a terminal voltage of the brake resistor R1.

As shown in FIG. 2, the passive drive circuit 400 may apply, by using the direct current bus voltage, a turn-on signal to the control terminal of the first switching element 210, to put the brake module 220 into operation to discharge electric energy, in response that the direct current bus voltage is greater than the second threshold.

The passive drive circuit 400 may be electrically connected between the positive pole DC+ of the direct current bus and the control terminal (for example, the gate) of the first switching element 210.

The passive drive circuit 400 can put the first switching element 210 into operation to discharge energy at a speed faster than a processing speed of the controller 100, when high voltage ride through occurs.

In other words, compared with that the controller 100 detects a high voltage and controls the first switching element 210 to be turned on to put the brake module 220 into operation to discharge energy, a response speed of the passive drive circuit 400 can be faster.

For example, when the controller 100 controls the first switching component 210 to be turned on and puts the brake module 220 into operation to discharge electric energy within a first period (in the order of milliseconds, for example, 2 ms), the passive drive circuit 400 can control the first switching element 210 to be turned on and put the brake module 220 into operation to discharge electric energy within a second period (in the order of microseconds, for example, a few microseconds) shorter than the first period.

The passive drive circuit 400 may include a transient voltage suppression (TVS) diode 410 which can be broken down when the direct current bus voltage is greater than the second threshold (1.3 pu), to apply the turn-on signal to the control terminal of the first switching element 210 by using the direct current bus voltage.

The transient voltage suppression diode 410 can undergo high voltage ride through multiple times and be repeatedly broken down, that is, and transient voltage suppression diode 410 can be reused and is of high reliability.

The passive drive circuit 400 may further include other auxiliary components, for example, divider resistors, etc.

As shown in FIG. 2, the passive drive circuit 400 may further include a diode 420, and the diode 420 may be connected in series between the transient voltage suppression diode 410 and a second switching element 430 in a forward orientation.

The diode 420 forms a clamp circuit with the transient voltage suppression diode 410, so as to keep a drive voltage supplied to the first switching element 210 stable, and prevent the first switching element 210 from being damaged by a high voltage shock. For example, the diode 420 can prevent energy flowing from the control terminal (for example, the gate) to the input terminal (for example, the collector) when the first switching element 210 is turned on.

As an example, the control, which the passive drive circuit 400 has over an energy discharge loop, may be further controlled by the controller 100.

For example, the passive drive circuit 400 may further include a second switching element 430 which may be connected in series between the transient voltage suppression diode 410 and the control terminal of the first switching element 210.

Electrode K of the transient voltage suppression diode 410 may be connected to the positive pole DC+ of the direct current bus, electrode A of the transient voltage suppression diode 410 may be connected to electrode A of the diode 420, and electrode K of the diode 420 may be connected to an input terminal (for example, a drain) of the second switching element 430.

The structure of the second switching element 430 may be identical to that of the first switching element 210. For example, the second switching element 430 may include one switching element, and the second switching element 430 may be a MOSFET, or an IGBT.

The controller 100 may control the first switching element 210 to be turned on at a predetermined instant after the transient voltage suppression diode 410 is broken down, and control the second switching element 430 to be turned off upon delaying for a predetermined period of time (for example, 1 ms) from the predetermined instant. That is, the controller 100 may output a high level through pin 5 when the first switching element 210 is turned on by a voltage generated based on the direct current bus voltage, and output, upon delaying for 1 ms from when a high level control signal is output to the first switching element 210, a turn-off signal to the second switching element 430.

Specifically, the controller 100 may be connected to a control terminal (for example, a gate) of the second switching element 430, thereby implementing on-off control of the second switching element 430.

As shown in FIG. 2, the control terminal of the second switching element 430 may be connected to pin 3 of the controller, and an output terminal (for example, a source) of the second switching element 430 may be connected to the control terminal (for example, the gate) of the first switching element 210.

The controller 100 may, on detecting that the direct current bus voltage returns to normal, control the first switching element 210 to be turned off to cut the brake module 220 out, and control the second switching element 430 to be turned on.

In other words, the controller 100 may control the brake resistor to be cut out, and control a switching element of a breakdown loop to be turned on, when the wind power converter operates normally.

Figure 3:
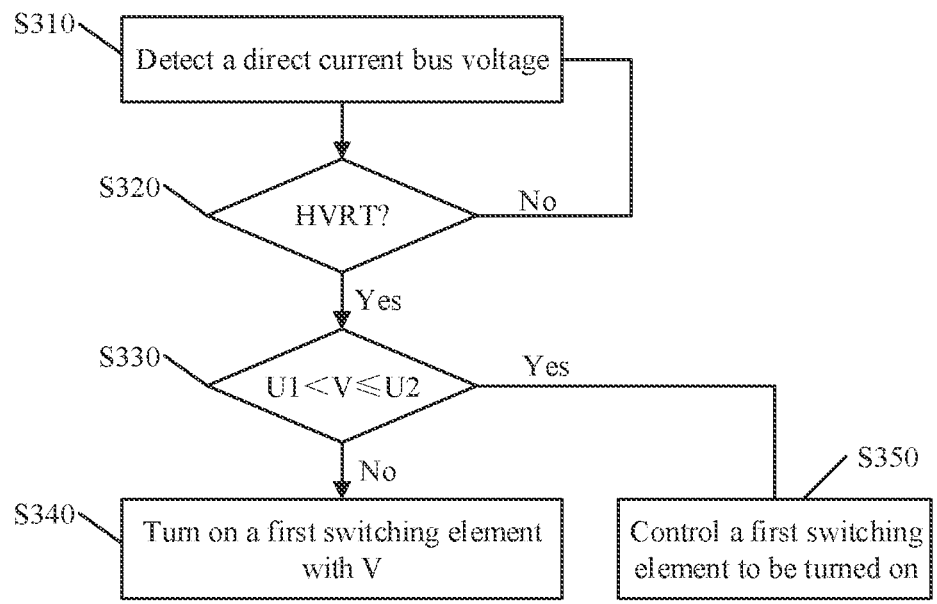
FIG. 3 is a flow chart of a high voltage ride through control method according to an embodiment of the present disclosure.

FIG. 3 is a flow chart of a high voltage ride through control method according to an embodiment of the present disclosure.

According to an embodiment of the present disclosure, a high voltage ride through control method for a wind turbine may include steps S310, S340, and S350.

As shown in FIG. 3, in step S310, a direct current bus voltage v is detected.

In a case that the direct current bus voltage is detected to be normal, pin 5 of the controller 100 may output a low level, and pin 3 of the controller 100 may output a high level, so that the first switching element 210 is controlled to be turned off and the second switching element 430 is controlled to be turned on. This is a normal operation mode of the wind power converter.

In step S340, in response to that the direct current bus voltage v is greater than the second threshold U2, the first switching element 210 is turned on by the direct current bus voltage v. Specifically, in response to that the direct current bus voltage v is greater than or equal to the second threshold U2, a turn-on signal is applied to the control terminal of the first switching element 210 by using the direct current bus voltage, to put the brake module 220 into operation to discharge electric energy.

In step S350, in response to that the high voltage ride through occurs and the direct current bus voltage v is greater than the first threshold U1 and less than or equal to the second threshold U2 (U1<V≤U2), the first switching element 210 is controlled to be turned on. Specifically, in response to that the high voltage ride through occurs and the direct current bus voltage v is greater than the first threshold U1 and less than or equal to the second threshold U2 (U1<V≤U2), the first switching element 210 of the unloading module 200 is controlled to be turned on to put the brake module 220 of the unloading module 200 into operation to discharge electric energy.

As shown in FIG. 3, the high voltage ride through control method may further include step S320 of determining whether a high voltage ride through situation occurs and step S330 of determining a range the detected voltage is in.

When it is determined that no high voltage ride through occurs, a normal operation mode may entered. When it is determined that the high voltage ride through occurs, a high voltage ride through mode may be entered.

In a case that the direct current bus voltage is greater than the second threshold, the transient voltage suppression diode 410 connected to the control terminal of the first switching element 210 may be broken down, so that a turn-on signal is applied to the control terminal of the first switching element 210 by using the direct current bus voltage.

Specifically, if the direct current bus voltage is greater than 1.3 times the rated voltage, the direct current bus voltage increases rapidly, so that the transient voltage suppression diode 410 is broken down, generating a breakdown voltage. The breakdown voltage or a voltage generated based on the breakdown voltage is supplied to the control terminal of the first switching element 210 to put the brake module 220 into operation to discharge electric energy. For example, the first switching element 210 may be turned on to put the brake module 220 into operation to discharge electric energy.

If the direct current bus voltage is less than or equal to 1.3 times the rated voltage, the transient voltage suppression diode 410 will not be broken down. The controller 100 may control pin 5 to output a high level, according to an increase of the direct current bus voltage collected by pin 1 and pin 2, so that the first switching element 210 is turned on, to put the brake resistor R1 into operation to discharge the electric energy on the direct current bus.

The first switching element 210 may be controlled to be turned on at a predetermined instant after the transient voltage suppression diode 410 is broken down, and the second switching element 430 may be controlled to be turned off upon delaying for a predetermined period of time from the predetermined instant.

For example, pin 5 of the controller may be set to a high level, and pin 3 of the controller 100 may be set to a low level upon delaying for 1 ms. In this way, the first switching element 210 is turned on, and the second switching element 430 is turned off after delaying for the predetermined period of time. Herein, the main purpose of turning off the second switching element 430 is to keep the whole system in a controllable state. The second switching element 430 may be turned on after it has been turned off for a short period of time, to enter a normal operation mode.

The first switching element 210 may be controlled to turn off to cut out the brake module 220, and the second switching element 430 may be controlled to turn on, when the direct current bus voltage is detected to return to normal.

As an example, after the high voltage ride through, the controller 100 detects that the direct current bus voltage is normal through pin 1 and pin 2, then pin 5 of the controller 100 is set to a low level to turn off the first switching element 210. In addition, pin 3 of controller 100 is set to a high level to turn on the second switching element 430. Thus, the wind power converter returns to the normal operation mode.

According to the embodiments in the present disclosure, the brake resistor can be put into operation within a time in the order of microseconds through the TVS transistor, and it can be ensured that the cut-out and subsequent put-in of the brake resistor is in a controllable range through the switching elements (for example, MOS transistors), avoiding overheating damage to a device caused by the brake module being put into operation for too long.

Furthermore, in this specification, the term "unit" or "module" may mean a hardware component such as a controller or circuit and/or a software component executed by a hardware component such as a controller.

For illustration, the above description of the present disclosure is provided. It will be understood by those skilled in the art that, without departing from the substantive characters, spirit and scope of the present disclosure whose scope is defined by the claims hereinafter, multiple form and detail modifications can be made in the present disclosure. Therefore, the above embodiments and all aspects are only examples and not limitations. For example, each component defined as an integrated component can be implemented in a distributed manner. Similarly, components defined as separate components can be implemented in an integrated manner.

According to the embodiments of the present disclosure, the apparatus (such as units or functions thereof) or the method may be implemented by a program or instructions stored in the computer readable storage medium. In a case that the instructions are executed by the processor or controller, the processor or controller can perform a function corresponding to the instructions or execute a method corresponding to the instructions. At least part of a module or unit can be implemented (for example, executed) by a processor or controller. A unit may include a module, program, routine, instruction set or procedure to perform at least one function. In an example, instructions or software include machine codes (for example, machine codes generated by a compiler) directly executed by one or more processors or controllers, or by a computer. In another example, instructions or software include higher-level codes executed by one or more processors or computers using an interpreter. The instructions or the software may be written in any programming language based on the block diagrams and flow charts shown in the drawings and the corresponding descriptions in the specification.

The units of the present disclosure may include at least one of the components hereinbefore with some components omitted or other components added. The operations or steps of a unit, a module, or other components can be performed sequentially, in parallel, in a loop, or tentatively. In addition, some operations or steps may be executed in a different order, may be omitted, or extended with other operations.

The high voltage ride through control apparatus according to the embodiments of the present disclosure may be a part of the wind power converter.

Electric energy can be discharged by the high voltage ride through control apparatus and the high voltage ride through control method according to the embodiments of the present disclosure.

The overheating damage to a device caused by the brake module being put into operation for too long can be avoided by the high voltage ride through control apparatus and the high voltage ride through control method according to the embodiments of the present disclosure.

For high voltage ride through of more than 1.3 times pu, the response speed is improved and reliability of the system is also ensured by the high voltage ride through control apparatus and the high voltage ride through control method according to the embodiments of the present disclosure.

Although some exemplary embodiments of the present disclosure are shown and described, those skilled in the art should understand that modifications can be made to the embodiments without departing from the principle and spirit of the present disclosure whose scope is defined by the claims and equivalents thereof. For example, technical features of different embodiments may be combined with each other. These variations and improvements are within the scope of the present disclosure.

The invention claimed is:

1. A high voltage ride through control apparatus of a wind turbine, the apparatus comprising:
an unloading module comprising a brake module and a first switching element connected in series with each other, configured to discharge electric energy when high voltage ride through occurs;
a controller, configured to detect a direct current bus voltage and control the first switching element to be turned on to put the brake module into operation to discharge electric energy, when the high voltage ride through occurs and the direct current bus voltage is greater than a first threshold and less than or equal to a second threshold; and
a passive drive circuit, configured to apply, by using the direct current bus voltage, a turn-on signal to a control terminal of the first switching element to put the brake module into operation to discharge electric energy, in response to that the direct current bus voltage is greater than the second threshold,
wherein, the passive drive circuit comprises a transient voltage suppression diode, and the transient voltage suppression diode is configured to be broken down when the direct current bus voltage is greater than the second threshold to apply the turn-on signal to the control terminal of the first switching element by using the direct current bus voltage to put the brake module into operation to discharge the electric energy,
wherein, the passive drive circuit further comprises a second switching element, the second switching element is connected in series between the transient voltage suppression diode and the control terminal of the first switching element,
and the controller controls the first switching element to be turned on at a predetermined instant after the transient voltage suppression diode is broken down, and controls the second switching element to be turned off upon delaying for a predetermined period of time from the predetermined instant.

2. The high voltage ride through control apparatus of a wind turbine according to claim 1, wherein,
the controller controls the first switching element to be turned off to cut out the brake module, and controls the second switching element to be turned on, on detecting that the direct current bus voltage returns to normal.

3. The high voltage ride through control apparatus of a wind turbine according to claim 1, wherein the passive drive circuit further comprises a diode, and the diode is connected in series between the transient voltage suppression diode and the second switching element in a forward orientation.

4. The high voltage ride through control apparatus of a wind turbine according to claim 1, wherein the brake module comprises a brake resistor and a freewheeling diode connected in parallel.

5. The high voltage ride through control apparatus of a wind turbine according to claim 1, wherein the first threshold is a rated voltage, the second threshold is 1.3 times the rated voltage, and the rated voltage is a rated voltage of a grid that the wind turbine is connected to.

6. A high voltage ride through control method of a wind turbine, the method comprising:
detecting, by a controller, a direct current bus voltage;
controlling, by the controller in response to that high voltage ride through occurs and the direct current bus voltage is greater than a first threshold and less than or equal to a second threshold, a first switching element of an unloading module to be turned on, to put a brake module of the unloading module into operation to discharge electric energy;
applying, by a passive drive circuit using the direct current bus voltage, a turn-on signal to a control terminal of the first switching element, to put the brake module into operation to discharge electric energy, in response to that the direct current bus voltage is greater than the second threshold,
wherein the passive drive circuit comprises a transient voltage suppression diode connected to the control terminal of the first switching element, and in a case that the direct current bus voltage is greater than the second threshold, the transient voltage suppression diode is broken down to apply the turn-on signal to the control terminal of the first switching element by using the direct current bus voltage to put the brake module into operation to discharge the electric energy,
wherein,
a second switching element is connected in series between the transient voltage suppression diode and the control terminal of the first switching element,
the first switching element is controlled to be turned on at a predetermined instant after the transient voltage suppression diode is broken down, and the second switching element is controlled to be turned off upon delaying for a predetermined period of time from the predetermined instant;

the first switching element is controlled to be turned off to cut out the brake module, and the second switching element is controlled to be turned on, on detecting that the direct current bus voltage returns to normal.

7. A wind power converter, comprising the high voltage ride through control apparatus of a wind turbine according to claim 1.

8. A wind turbine, comprising the wind power converter according to claim 7.

9. The high voltage ride through control apparatus of a wind turbine according to claim 4, wherein the first threshold is a rated voltage, the second threshold is 1.3 times the rated voltage, and the rated voltage is a rated voltage of a grid that the wind turbine is connected to.

10. The high voltage ride through control apparatus of a wind turbine according to claim 3, wherein the first threshold is a rated voltage, the second threshold is 1.3 times the rated voltage, and the rated voltage is a rated voltage of a grid that the wind turbine is connected to.

11. The high voltage ride through control apparatus of a wind turbine according to claim 6, wherein the first threshold is a rated voltage, the second threshold is 1.3 times the rated voltage, and the rated voltage is a rated voltage of a grid that the wind turbine is connected to.

* * * * *